(12) United States Patent
Jaroch et al.

(10) Patent No.: US 11,593,484 B2
(45) Date of Patent: Feb. 28, 2023

(54) PROACTIVE BROWSER CONTENT ANALYSIS

(71) Applicant: Webroot Inc., Broomfield, CO (US)

(72) Inventors: Joe Jaroch, Elk Grove Village, IL (US); Harry Murphey McCloy, III, Longmont, CO (US); Robert Edward Adams, Sunnyvale, CA (US)

(73) Assignee: Webroot Inc., Broomfield, CO (US)

( * ) Notice: Subject to any disclaimer, the term of this patent is extended or adjusted under 35 U.S.C. 154(b) by 12 days.

(21) Appl. No.: 17/221,028

(22) Filed: Apr. 2, 2021

(65) Prior Publication Data

US 2021/0224389 A1    Jul. 22, 2021

Related U.S. Application Data

(63) Continuation of application No. 16/036,022, filed on Jul. 16, 2018, now Pat. No. 11,281,777, which is a continuation of application No. 13/633,956, filed on Oct. 3, 2012, now Pat. No. 10,025,928.

(60) Provisional application No. 61/542,693, filed on Oct. 3, 2011.

(51) Int. Cl.
*H04L 29/06* (2006.01)
*G06F 21/56* (2013.01)

(52) U.S. Cl.
CPC ................... *G06F 21/566* (2013.01)

(58) Field of Classification Search
None
See application file for complete search history.

(56) References Cited

U.S. PATENT DOCUMENTS

| | | |
|---|---|---|
| 6,029,245 A | 2/2000 | Scanian |
| 6,594,697 B1 | 7/2003 | Praitis |
| 6,898,619 B1 | 5/2005 | Tran |
| 7,621,613 B2 | 5/2009 | McClintock |
| 8,370,938 B1 | 2/2013 | Daswani |
| 8,464,318 B1 | 6/2013 | Hallak |
| 10,025,928 B2 | 7/2018 | Jaroch et al. |
| 2003/0037236 A1 | 2/2003 | Simon et al. |
| 2003/0051142 A1* | 3/2003 | Hidalgo ............ H04L 63/04 713/176 |

(Continued)

OTHER PUBLICATIONS

Office Action issued for U.S. Appl. No. 13/633,956, dated Jul. 18, 2013, 11 pages.

(Continued)

*Primary Examiner* — Jeffery L Williams
(74) *Attorney, Agent, or Firm* — Sprinkle IP Law Group

(57) ABSTRACT

A protection module operates to analyze threats, at the protocol level (e.g., at the HTML level), by intercepting all requests that a browser engine resident in a computing device sends and receives, and the protection agent completes the requests without the help of the browser engine. And then the protection module analyzes and/or modifies the completed data before the browser engine has access to it, to, for example, display it. After performing all of its processing, removing, and/or adding any code as needed, the protection module provides the HTML content to the browser engine, and the browser engine receives responses from the protection agent as if it was speaking to an actual web server, when in fact, browser engine is speaking to an analysis engine of the protection module.

20 Claims, 4 Drawing Sheets

(56) References Cited

U.S. PATENT DOCUMENTS

| | | | |
|---|---|---|---|
| 2004/0015725 A1 | 1/2004 | Boneh et al. | |
| 2004/0073811 A1 | 4/2004 | Sanin | |
| 2004/0260754 A1 | 12/2004 | Olson | |
| 2008/0034424 A1* | 2/2008 | Overcash | H04L 63/1416 726/22 |
| 2008/0034425 A1* | 2/2008 | Overcash | H04L 63/1425 726/22 |
| 2009/0019525 A1* | 1/2009 | Yu | H04L 63/1483 717/104 |
| 2009/0070873 A1 | 3/2009 | McAfee | |
| 2009/0125976 A1 | 5/2009 | Wassermann et al. | |
| 2009/0193497 A1 | 7/2009 | Kikuchi et al. | |
| 2010/0319070 A1 | 12/2010 | Born | |
| 2011/0078309 A1 | 3/2011 | Bloch et al. | |
| 2011/0219446 A1 | 9/2011 | Ichinowski | |
| 2011/0239288 A1 | 9/2011 | Cross et al. | |
| 2012/0047581 A1 | 2/2012 | Banerjee | |
| 2012/0260315 A1* | 10/2012 | Hidalgo | H04L 63/04 726/4 |
| 2013/0007870 A1 | 1/2013 | Devarajan | |
| 2013/0055386 A1 | 2/2013 | Kim et al. | |
| 2013/0086681 A1 | 4/2013 | Jaroch et al. | |
| 2015/0032552 A9 | 1/2015 | Holloway et al. | |
| 2016/0149940 A1 | 5/2016 | Davis | |
| 2017/0201534 A1 | 7/2017 | Stavrou et al. | |
| 2018/0004765 A1 | 1/2018 | Holloway et al. | |
| 2019/0052576 A1 | 2/2019 | Holloway et al. | |
| 2019/0171817 A1 | 6/2019 | Jaroch | |
| 2019/0354709 A1 | 11/2019 | Brinskelle | |

OTHER PUBLICATIONS

Scott et al., "Abstracting Application-Level Web Security," Proceedings of the 11th International Conference on World Wide Web (WWW '02), ACM, 2002, pp. 396-407.

Office Action issued for U.S. Appl. No. 13/633,956, dated Mar. 11, 2014, 15 pages.

Office Action issued for U.S. Appl. No. 13/633,956, dated Oct. 23, 2014, 10 pages.

Office Action issued for U.S. Appl. No. 13/633,956, dated Jun. 11, 2015, 13 pages.

Office Action issued for U.S. Appl. No. 13/633,956, dated Jan. 21, 2016, 14 pages.

Office Action issued for U.S. Appl. No. 13/633,956, dated Nov. 1, 2016, 12 pages.

Office Action issued for U.S. Appl. No. 13/633,956, dated May 19, 2017, 11 pages.

Office Action issued for U.S. Appl. No. 13/633,956, dated Oct. 6, 2017, 12 pages.

Office Action issued for U.S. Appl. No. 16/036,022, dated May 31, 2019, 11 pages.

Office Action issued for U.S. Appl. No. 16/036,022, dated Nov. 29, 2019, 10 pages.

Office Action issued for U.S. Appl. No. 16/036,022, dated Apr. 2, 2020, 11 pages.

Office Action issued for U.S. Appl. No. 16/036,022, dated Jul. 23, 2020, 12 pages.

Office Action issued for U.S. Appl. No. 16/036,022, dated Jan. 19, 2021, 13 pages.

Office Action for U.S. Appl. No. 16/036,022, dated Apr. 26, 2021, 12 pgs.

Office Action for U.S. Appl. No. 16/036,022, dated Aug. 6, 2021, 13 pgs.

Defendant Forcepoint LLC's Preliminary Invalidity Contentions, Exhibit 289-E-2, *Webroot, Inc. and Open Text, Inc.v. Forcepoint LLC*, No. 6:22-CV-00342-ADA-DTG (WD, Texas), Sep. 13, 2022, 25 pgs.

Defendant Forcepoint LLC's Preliminary Invalidity Contentions, Exhibit 289-E-3, *Webroot, Inc. and Open Text, Inc.v. Forcepoint LLC*, No. 6:22-CV-00342-ADA-DTG (WD, Texas), Sep. 13, 2022, 28 pgs.

Defendant Forcepoint LLC's Preliminary Invalidity Contentions, Exhibit 289-E-4, *Webroot, Inc. and Open Text, Inc.v. Forcepoint LLC*, No. 6:22-CV-00342-ADA-DTG (WD, Texas), Sep. 13, 2022, 31 pgs.

Defendant Forcepoint LLC's Preliminary Invalidity Contentions, Exhibit 289-E-5, *Webroot, Inc. and Open Text, Inc.v. Forcepoint LLC*, No. 6:22-CV-00342-ADA-DTG (WD, Texas), Sep. 13, 2022, 31 pgs.

Scott, David, et al., Abstracting Application-Level Web Security, WWW 2002, Honolulu, HI, May 7-11, 2002, pp. 396-407.

Dewald, Andreas, et al., ADSandbox: Sandboxing JavaScript to fight Malicious Websites, SAC' 2010, Sierre, Switzerland, Mar. 22-26, 2010, pp. 1859-1864.

Le, Van Lam, et al., Identification of Potential Malicious Web Pages, Australian Computer Society, Ninth Australasian Information Security Conf., Perth Australia, CRPIT vol. 116 Information Security, 2011, pp. 33-40.

Canali, David, et al., Prophiler: A Fast for the Large-Scale Detection of Malicious Web Pages, WWW 2011 Session: Web Security, Hyderabad, IN, Mar. 28-Apr. 1, 2011, 10 pgs.

Chen, Kevin, et al., WebPatrol: Automated Collection and Replay of Web-based Malware Scenarios, ASIACCS, 2011, Hong Kong, CN, Mar. 22-24, 2011, pp. 186-195.

Yan, Wei, et al., Toward Automatic Discovery of Malware Signature for Anti-Virus Cloud Computing, International Conference on Complex Sciences, Springer, Berlin, Heidelberg, 2009, pp. 724-728.

Martinez, Cristian Adrian, et al., Malware detection based on Cloud Computing Integrating Intrustion Ontology Representation, IEEE Latin-American Conference on Communications, 2010, 6 pgs.

Wang, Shu-Ching, et al., A Three-Phases Scheduling in a Hierarchical Cloud Computing Network, Third International Conference on Communications and Mobile Computing, IEEE, 2011, pp. 114-117.

Defendant Forcepoint LLC's Preliminary Invalidity Contentions, *Webroot, Inc. and Open Text, Inc.v. Forcepoint LLC*, No. 6:22-CV-00342-ADA-DTG (WD, Texas), Sep. 13, 2022, 149 pgs.

Defendant Forcepoint LLC's Preliminary Invalidity Contentions, Exhibit 289-E-1, *Webroot, Inc. and Open Text, Inc.v. Forcepoint LLC*, No. 6:22-CV-00342-ADA-DTG (WD, Texas), Sep. 13, 2022, 27 pgs.

Defendant Forcepoint LLC's Preliminary Invalidity Contentions, Exhibit 289-E-1, *Webroot, Inc. and Open Text, Inc.v. Forcepoint LLC*, No. 6:22-CV-00342-ADA-DTG (WD, Texas), Sep. 13, 2022, 25 pgs.

Defendant Forcepoint LLC's Preliminary Invalidity Contentions, Exhibit 289-E-1, *Webroot, Inc. and Open Text, Inc.v. Forcepoint LLC*, No. 6:22-CV-00342-ADA-DTG (WD, Texas), Sep. 13, 2022, 28 pgs.

Defendant Forcepoint LLC's Preliminary Invalidity Contentions, Exhibit 289-E-1, *Webroot, Inc. and Open Text, Inc.v. Forcepoint LLC*, No. 6:22-CV-00342-ADA-DTG (WD, Texas), Sep. 13, 2022, 31 pgs.

* cited by examiner

PROACTIVE BROWSER CONTENT ANALYSIS

CROSS REFERENCE TO RELATED APPLICATION

This application is a continuation of and claims a benefit of priority under 35 U.S.C. 120 from U.S. patent application Ser. No. 16/036,022, filed Jul. 16, 2018, entitled "Proactive Browser Content Analysis," issued as U.S. Pat. No. 11,291,777, which is a continuation of U.S. patent application Ser. No. 13/633,956, filed Oct. 3, 2012, entitled "Proactive Browser Content Analysis," issued as U.S. Pat. No. 10,025,928, claims the benefit of and priority under 35 U.S.C. § 119(e) to U.S. Provisional Application No. 61/542,693, filed Oct. 3, 2011, entitled "Proactive Browser Content Analysis," the disclosures of which are hereby incorporated by reference herein in their entireties.

FIELD

An exemplary aspect of the present invention generally relates to computer system management. In particular, but not by way of limitation, an exemplary aspect relates to systems and methods for controlling pestware or malware or other undesirable or unwanted applications and/or instructions.

BACKGROUND

Personal computers and business computers are continually attacked by viruses, trojans, spyware, adware, etc., collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actually beneficial or wanted by the user. Wanted pestware is sometimes not characterized as "pestware" or "spyware." But, unless specified otherwise, "pestware" or "malware" as used herein refers to any program that is malicious in some way and/or collects and/or reports information about a person or an organization and any "watcher processes" related to the pestware or malware.

SUMMARY

In accordance with an exemplary aspect, a protection module operates to analyze threats, at the protocol level (e.g., at the HTML level), by intercepting all requests that a browser engine resident in a computing device sends and receives, and the protection agent completes the requests without the help of the browser engine.

And then the protection module analyzes and/or modifies the completed data before the browser engine has access to it, to, for example, display it. After performing all of its processing, removing, and/or adding any code as needed, the protection module provides the HTML content to the browser engine, and the browser engine receives responses from the protection agent as if it was speaking to an actual web server, when in fact, browser engine is speaking to an analysis engine of the protection module.

This allows the protection module to have control over what a browser engine "sees," providing means to remove any exploits, malware, and other threats dynamically. This also enables the protection module to add content into the browser stream at the HTML level, before receipt by the browser.

In some exemplary implementations, search engine results (e.g., results provided by Google®, Yahoo®, and Binge) are annotated/updated/amended by the protection module—within the HTML code—to denote if a particular website is legitimate or malicious. For example, a legitimate link in the search results may be depicted in connection with a green check mark and a suspect link may be depicted with a red cross. (Of course other indicators could also be used that identify to a user whether or not a link is "good," "bad," or "unknown.") In addition to search result annotation, the protocol-level analysis approach may also be used in connection with anti-phishing and URL analysis among other types of analysis.

The differences between the disclosed protocol-level analysis approach compared to other prior anti-malware approaches are significant. In the context of search result annotation for example, the data (e.g., a web page of search results) is first analyzed and modified by an analysis engine of the protection module, which has control over every element of a web page before the web page is operated on by the browser engine. This is in contrast to prior approaches that just make high-level modifications to the content after the content has been rendered and displayed through a Browser Helper Object. With an exemplary aspect of the present protocol-level approach, there is virtually no performance overhead, and in many cases, there is actually a performance improvement when performing the browser content analysis.

When the protection module receives content from a web server, the protection module then, if necessary, decrypts and decompresses the web content and then assembles the requested web page (e.g., in a decrypted and decompressed HTML format that the web page existed in at the remote server). The protection module then analyzes the web page to determine whether the web page includes links that may lead to sites hosting malware or whether the web page itself includes malware. The analysis of the assembled web page may include communicating with a remote security center so that a malware management analysis may be performed to analyze one or more portions of the content of the assembled web page and/or the protection module itself may perform analysis of content of the assembled webpage. The analyzed webpage can then be forwarded to the web browser for display to a user.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
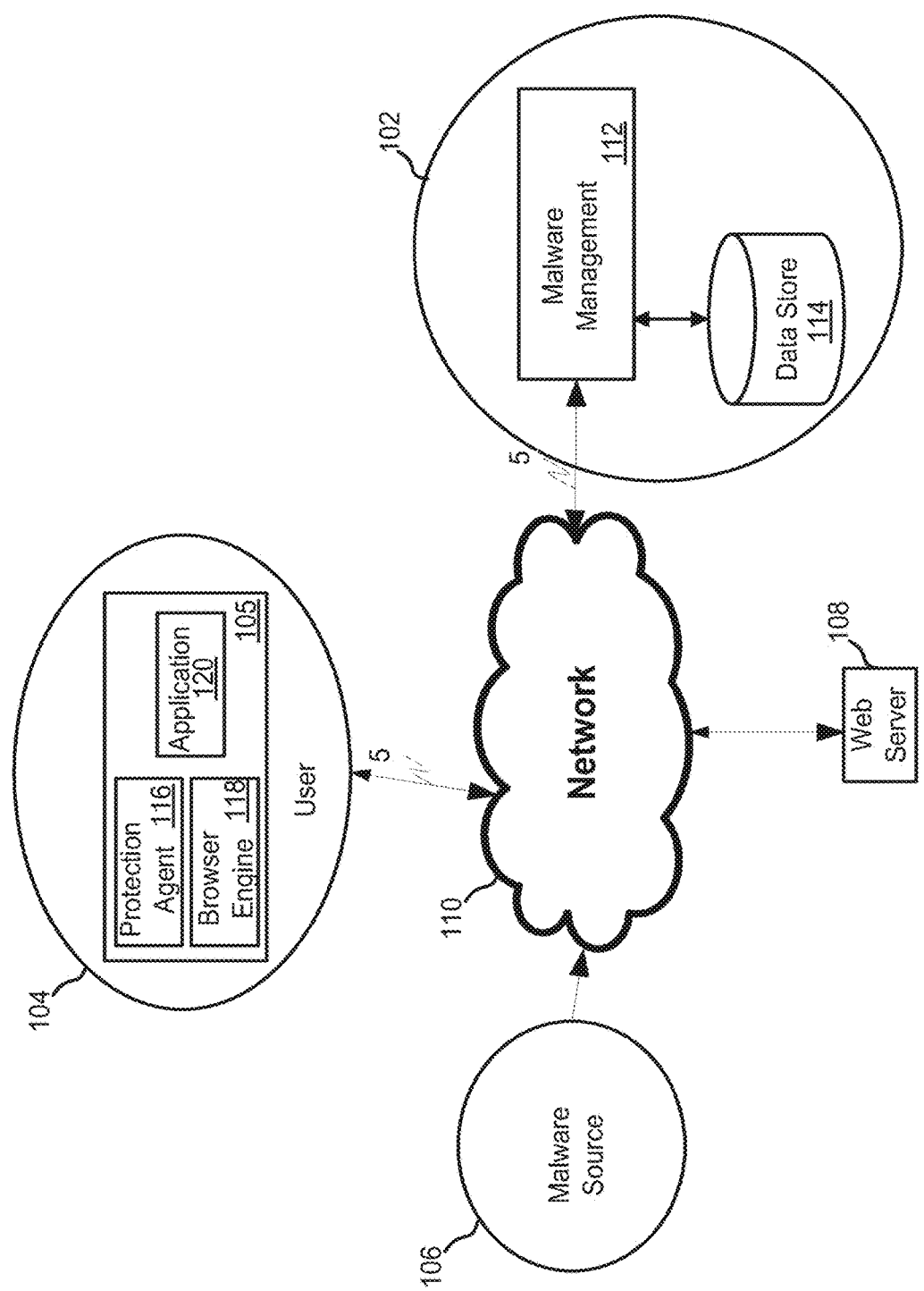
FIG. 1 illustrates an exemplary embodiment of a computing environment according to an exemplary embodiment.

Referring now to the drawings, where like or similar elements are designated with identical reference numerals throughout the several views, and referring in particular to FIG. 1, it is a block diagram depicting an environment in which several embodiments of the invention may be implemented. As shown, a security center 102 (also referred to herein as a "central" or "base" computer), remote user 104 operating a remote computer 105, a malware source 106, and a web server 108 are all communicatively coupled through one or more networks (e.g., the Internet and/or local or wide area networks) 110 and links 5. Although only one remote user 104, remote computer 105, malware source 106, web server 108, and security center 102 are depicted, each of these logically represents a potentially unlimited number of persons, entities and/or computers or computing resources.

The remote user 104 may be an individual or a business enterprise that operates the remote computer 105, which may each be a personal computer, a server of any type, a PDA, mobile phone, tablet, netbook, an interactive television, or any other device capable of loading and operating computer objects.

In the depicted environment, the malware source 106 generally represents a source of malware that ends up or is strategically placed at the web server 108, which may or may not be suspected of hosting malware. For example, the malware source 106 may generate a malware object in a variety of forms including in a scripting language such as ECMAscript-based scripting languages (e.g., JavaScript or Adobe Flash), but the malware source may generate other types of objects such as computer files, part of a file or a sub-program, an instruction(s), macro, web page or any other piece of code to be operated by or on the computer, or any other event whether executed, emulated, simulated or interpreted.

As depicted, the security center 102 is disposed and configured to be accessible to the user 104 so that, as discussed further herein, the security center 102 may facilitate the management of malware on the remote computer 104. In many implementations, the security center 102 operates according to a Software as a Service (SaaS) business model to generally provide Web security services "in the cloud."

As depicted in FIG. 1, the exemplary security center 102 includes a malware management portion 112 that is coupled to a data store 114. Although not depicted, the security center 102 may also include components that provide other services (e.g., internet policy enforcement, in/outbound content control, application control, compliance-related services, etc.).

The security center 102 is generally configured to obtain information about malware threats and to be a resource for the remote computer 105 to enable the remote computer to manage malware threats more effectively and efficiently. It should be noted that that the malware management component 112 and data store 114 are presented for convenience as single entities, but the security center 102 can be scaled and comprised of multiple geographically distributed computers and servers, etc., and the data store can be made up multiple databases and storage distributed around this central system and/or be located in a cloud-type environment.

Although not required, the malware management 112 component of the security center 102 may maintain the data store 114 as a community database that is populated, over time, with information relating to each object run on all of the connected remote computers as disclosed in US A 2007/0016953, published 18 Jan. 2007, entitled "METHODS AND APPARATUS FOR DEALING WITH MALWARE," the entire contents of which are hereby incorporated herein by reference. As discussed in the above-identified application, data representative of each malware object may take the form of a so-called signature or key relating to and/or identifying the object, its attributes and/or behavior(s).

In operation, the protection agent 116 in this embodiment operates to analyze threats, at the protocol level (e.g., at the HTML level), by intercepting all requests that the browser engine 118 sends and receives, and the protection agent 116 completes the requests without the help of the browser engine 118. And then the protection agent 116 analyzes and/or modifies the completed data before the browser engine 118 has access to it. After performing all of its processing, removing, and/or adding any code as needed, the protection agent feeds the HTML content back to the browser engine 118, and the browser engine 118 receives responses from the protection agent 116 as if it was "speaking" to an actual web server (e.g., web server 108) when in fact, it is speaking to an analysis engine of the protection agent 116. This allows the protection agent 116 to have full control over what the browser engine 118 "sees," providing means to remove any exploits, malware, and other threats dynamically. This also enables the protection agent 116 to add content into the browser stream at the HTML level. Stated another way, the protection agent 116 caches web content requested by a browser, analyzes and/or modifies the retrieved web content, and provides a clean or sanitized version of the web content, free of malware, to the browser.

In some optional implementations for example, search engine results (e.g., results provided by Google, Yahoo, and Bing) are annotated by the protection agent 116—within the HTML code—to denote if a particular website is legitimate or malicious. For example, a legitimate link in the search results may be depicted in connection with a green check mark and a suspect link may be depicted with a red cross. In addition to search result annotation, the protocol-level analysis approach may also be used in connection with anti-phishing and URL analysis among other types of analysis.

The differences between the protocol-level analysis approach disclosed herein as compared to other prior anti-malware approaches are significant. In the context of search result annotation for example, the data (e.g., a web page of search results) is first analyzed and modified by an analysis engine of the protection agent 116, which has full control over every element of the web page before the page is operated on by the browser engine 118. This is in contrast to prior approaches that just make high-level modifications to the content after it has been displayed through a Browser Helper Object. With the present protocol-level approach, there is virtually no performance overhead, and in many cases, there is actually a performance improvement when performing the browser content analysis.

When the protection agent 116 receives content from the web server 108, the protection agent 116 then, if necessary, decrypts and decompresses the web content and then assembles the requested web page (e.g., in a decrypted and decompressed HTML format that the web page existed in at the remote server 108). The protection agent 116 then analyzes the web page to determine whether the web page includes links that may lead to sites hosting malware or whether the web page itself includes malware. The analysis of the assembled web page may include communicating with the security center 102 so that the malware management component 112 may analyze one or more portions of the content of the assembled web page and/or the protection agent 116 itself may perform analysis of content of the assembled webpage.

In many embodiments, the cleaning process that the protection agent 116 carries out takes place through a highly optimized routine written in, for example, raw C with an inline assembler reducing processing effort within the browser engine 118 itself by decrypting/decompressing/de-encoding any of the content outside of the browser engine 118. Having full control at this level also means that complex inferential algorithms can be applied to the browser content as a whole, taking into account any external script/image links, to build an in-memory picture of the final content before it is rendered to the user by the browser on a display (not shown). This general operation can be extended to remove/modify any form of content, whether illicit images, ads, fake password request forms, malicious exploits, cross site scripting attacks (XSS), etc.

Figure 2:
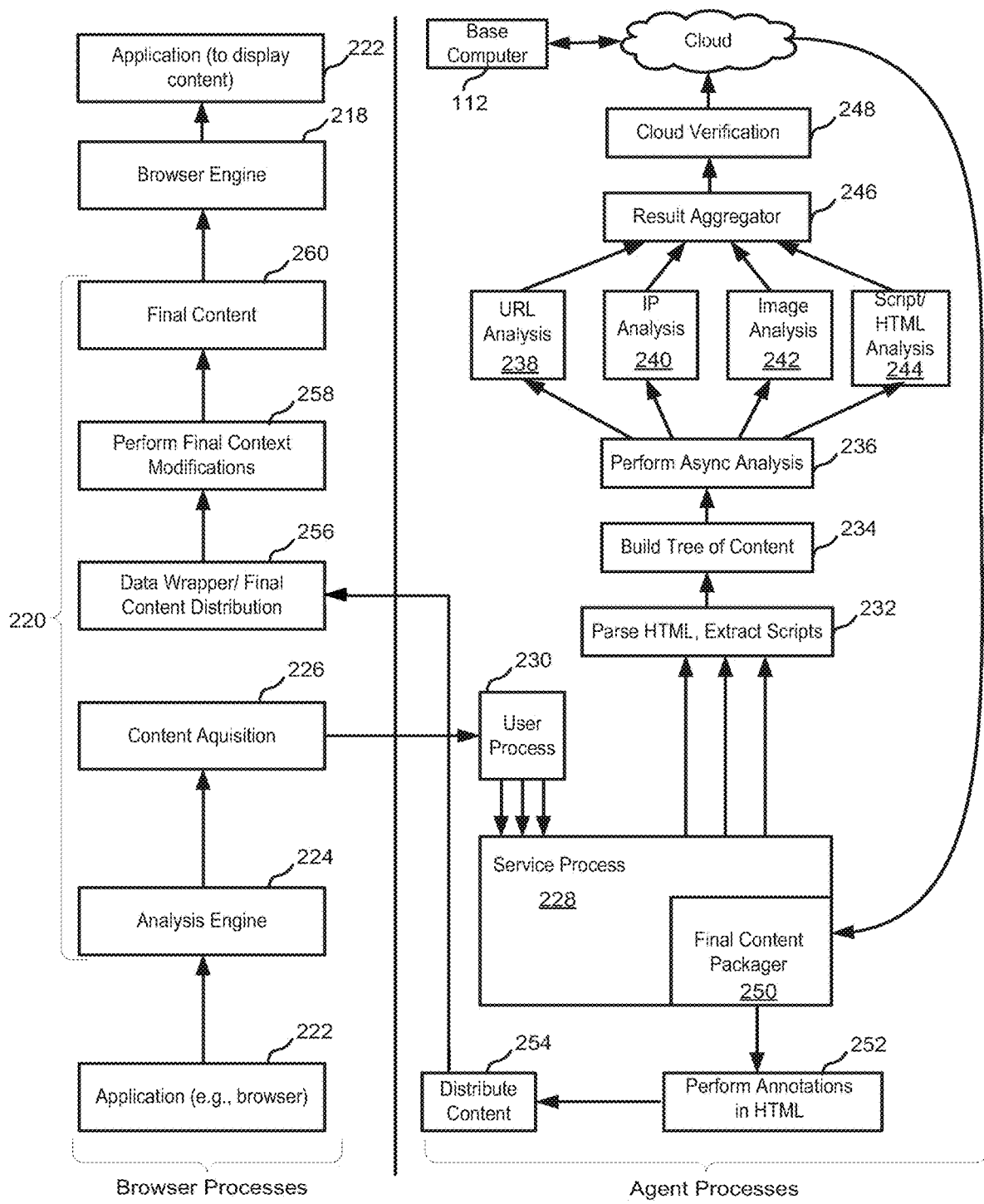
FIG. 2 illustrates an exemplary embodiment of systems and operations at the remote computer.
Figure 3:
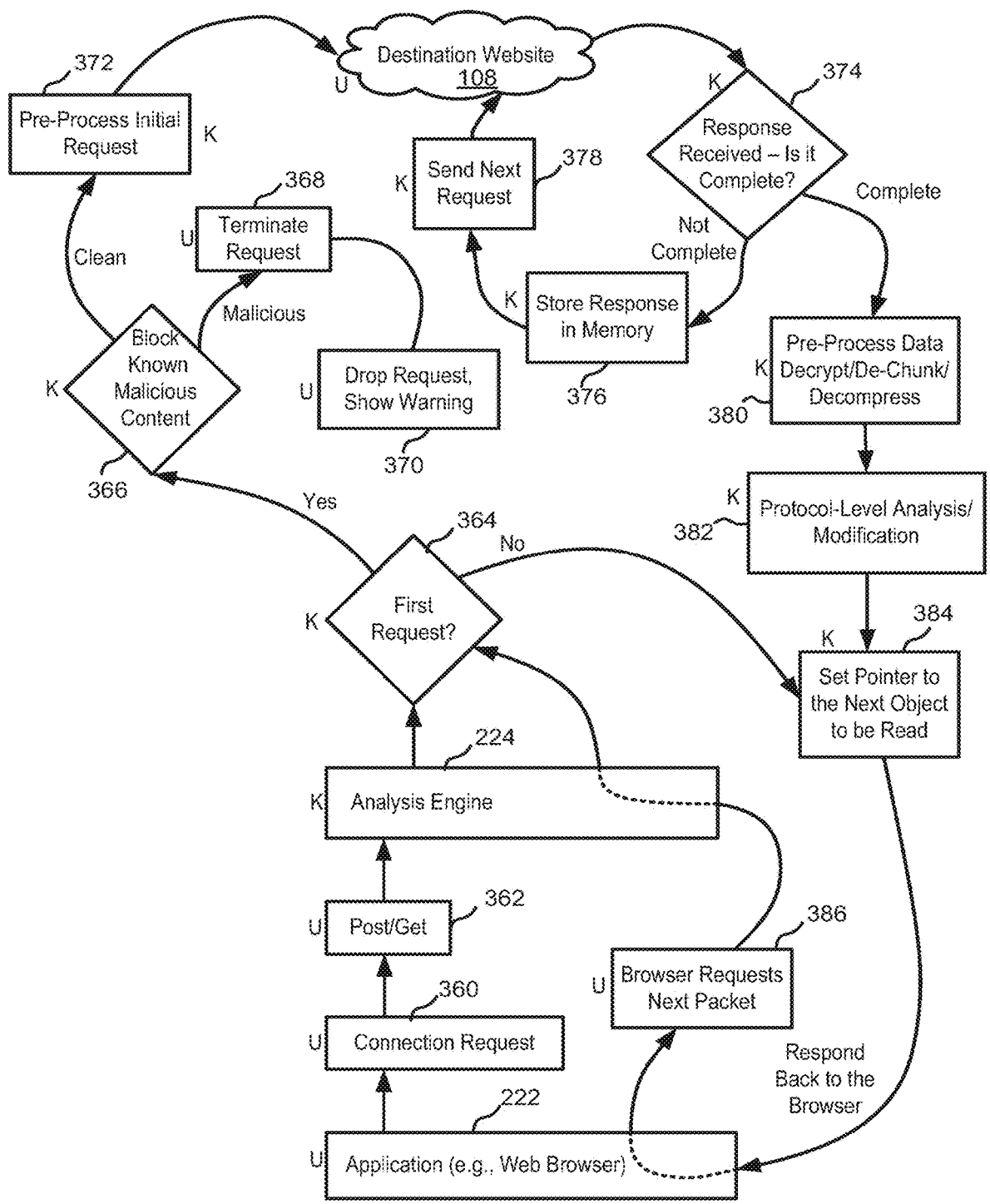
FIG. 3 is a flowchart illustrating exemplary process flow at the remote computer.

Referring to FIG. 2, shown is a block diagram depicting exemplary functional components and operations that reside and take place on the remote computer 105 at the location of the remote user 104. In the depiction of FIG. 2, the browser-related processes and protection-agent-related processes are separated so that the interaction between the two types of processes may be more clearly understood. While referring to FIG. 2, simultaneous reference is also made to FIG. 3, which depicts exemplary aspects of the process flow that occurs in connection with the components depicted in FIG. 2. Depicted next to each of the blocks in FIG. 3 is either a "K" or a "U," which indicate that the operation is implemented at the kernel or user-level, respectively. It should be recognized, however, that the operations described with reference to FIGS. 2 and 3 may be implemented with some kernel-mode operations being implemented at the user-level and vice versa. Moreover, the illustrated arrangement of components in FIGS. 2 and 3 is logical, and is not meant to be an actual hardware diagram. Thus, many of the components can be combined and/or further separated in an actual implementation.

As shown, the browser processes in this embodiment include agent processes 220 that are installed on the remote computer 105 in connection with the protection agent 116 so that functions of the protection agent 116 are integrated with a typical browser engine 218. In other words, the agent processes 220 of the browser processes are implemented by additional code that is wrapped around a typical browser engine 218 to intercept what is requested and received. As discussed further herein, these agent processes 220 enable all content that is requested by an application 222 (e.g., a browser) and received by the browser engine 218 to be intercepted.

More specifically as shown, when a user initiates a request via the application 222 (e.g., web browser or other application that requests web content), a connection request 360 is initiated as a POST/GET request 362 to a website (e.g., hosted by the webserver 108) and the analysis engine 224 looks at the context of the request to assess whether the request is the first request in a session (Block 364), and if the request is the first request, a determination is made as to whether the request is associated with known, malicious content (Block 366), and if so, the request is blocked (Blocks 368, 370).

In some embodiments, the analysis engine 224 accesses the security center 102 via the Internet and the security center 102 is utilized to facilitate whether the request is a request for known malicious content (e.g., the URL of the request may be compared to a black list of URLs). But the analysis engine 224 may also include some malware checking functionality locally. As shown, if the request is not blocked, the request may be pre-processed by the content acquisition component 226 (Block 372) (e.g., to set aside sufficient memory in RAM in anticipation of the content from the website being received) before the request is sent to the destination website 108.

And as shown, when the first response is received by the content acquisition component 226 (Block 374), if the response is not complete, the response is stored in memory (Block 376), and the next request is sent to the destination website 108 (Block 378). In this way, the content acquisition component 226 continues to obtain content from the website 108 (Blocks 374, 376, 378) until the web page is complete, and the complete page is held in memory by the content acquisition component 226.

Thus, in short, the initial request 360 by the application (e.g., browser) is intercepted and if the request does not appear to be a request for malicious content, the content acquisition component 226 iteratively sends requests and receives content (Blocks 374, 376, 378) from the website 108 until the requested content has been completely received. This is very different from the ordinary operation of the browser engine 218, which would (if unaltered by the protection agent 116) obtain the content from the webserver 108 itself by way of a series of GET requests.

As shown in FIG. 2, once the web content is completely gathered by the content acquisition component 226, the content is passed along to the service process component 228 via the user process component 230, and the data is then preprocessed (Block 380), if necessary, to decrypt, remove chunks, and decompress the gathered content. When a web page is received from the webserver 108, it may be compressed, chunked encoded, and encrypted, and decompressing, decoding and unencrypting the content enables a complete picture of the webpage looked like before if any of the these forms of obfuscation were applied to the content by the webserver 108. One of ordinary skill in the art will appreciate that various layers of encoding and compression may be applied to content, but for simplicity, these known details are not included herein for clarity.

And after the data is decrypted and decompressed, the data is in an HTML format, so at this point, the protection has the content in the same HTML format that the website 108 had the content in. And at this point the browser engine 218 is unaware that the requested content (e.g., an entire webpage) has been received. As a consequence, the browser page may be analyzed by the protocol-level analysis/modification component 382 depicted in FIG. 3 outside of the context of the browser engine 218 before the browser engine 218 has operated on the webpage. For example, all the links in the webpage, all the pictures in the webpage, and any scripts in the webpage may be analyzed at a low level of granularity. And code may be changed, enhanced, and removed according to default modes and/or user-configurable mode of operation. As one particular example, if a malicious script is found, it may be commented out before the content is handed to the browser engine.

In addition, in many modes of operation the protocol-level analysis/modification component 382 modifies and/or annotates the content—as HTML within the content—to provide the user with textual, audible and/or graphical indicators of risk associated with the content. In the context of a webpage that include search results from a user's search query, for example, a green check may be added within the HTML code next to a result that is a low risk link, and a red X may be added within the HTML code next to a result the is a high risk link. For example, an image tag and/or text may be added within the HTML to indicate a risk of being exposed to malware. Beneficially, making modifications to the content (e.g., to include risk indicators) at the HTML level avoids having to address the differences that different browsers introduce into the presentation of rendered content.

This approach of modifying content at the HTML level (e.g., to add annotations) is very different than the prior approaches of rendering (e.g., using a Browser Helper Object) annotations on top of a page that has already been parsed and rendered by a browser engine. This prior approach is problematic because it allows the browser engine to potentially execute malicious scripts or perform malicious actions while it is parsing and rendering the code. And in addition, because the annotations are added after rending, the annotation process must account for the rendering differences (e.g., differences in how and where content is displayed) that different browsers (e.g., Firefox, Safari, Chrome, Internet Explorer, etc.) exhibit.

It should be recognized that although search results annotation is one application for the protocol-level (e.g., HTML level) handling of content, it is certainly contemplated that there are other anti-malware-related applications of the protocol-level handling of content. One application for example, is an anti-phishing application, which may automatically modify HTML data so that user need not type in a password and expose the password to a keylogger object.

As shown in FIG. 2, more details of the protocol-level analysis/modification component 382 are depicted. As shown, once a complete collection of content is received, the service process 228 is utilized to initiate parsing of the HTML content and extraction of any scripts 230 in the content before building a tree representation of the content 234, which is then asynchronously analyzed 236. As shown in FIG. 2 for example, the analysis may include URL analysis 238, IP analysis 240, image analysis (e.g., to analyze phishing threat) 242, and script/HTML analysis 244. The results of the analysis are then aggregated by the result aggregator 246 so that cloud verification 248 may be performed on the single aggregated collection of data by the base computer 112 of the security center 102 to determine malware vulnerabilities.

But in optional embodiments, the verification may be effectuated locally or in combination with the security center 102. As shown, the results of the cloud verification are provided to the final content packager 250 of the service process 228, and then in some modes of operation, annotations are performed 252 on the packaged HTML code before being distributed 254 back to the data wrapper component 256, which sits on top of the response receive component of the browser engine 218 and performs final context modifications 258 to ensure content is properly displayed before being passed to the browser engine 218. As shown, final content modifications are performed at 258 before the final content 260 is provided to the browser engine 218 for parsing and rendering of the HTML content before being displayed by the application 222.

Referring again to FIG. 3, shown is a loop (Blocks 384, 386, 364) that depicts the cleaned and/or annotated content being fed back to the browser engine 218. As shown, as the browser engine requests more content, the pointer is set to the next byte to be read (Block 384), and once all the content is on hand, the browser engine requests content (Block 386), and the cleaned and/or annotated content is fed to the browser engine 218 in the manner the browser engine 218 would have requested and received the content.

In other words, from the browser engine's 218 perspective, the browser engine 218 is obtaining the content from the webserver 108 directly. In other words, the protection agent 116 operates as an emulated server in memory to provide the clean content in the way the web server 108 would have provided the content to the browser engine 118, 218 if the browser received the content form the web server 108 directly.

In the exemplary embodiment however, for operational speed, the clean/modified content is not encoded or encrypted once it is cleaned. As a consequence, the packet headers (e.g., length headers) are modified to reflect that the content being provided to the browser engine 118, 218 is in a decrypted, decompressed, and/or de-chunked format. In this way, the browser is not expecting to receive encrypted, encoded, compressed content. Beneficially, the decryption and decompression is carried out with code implemented in raw C (and most browsers are written in a high level language), so the decryption and decompression are actually carried out faster than an ordinary browser would do so. Additionally, the decryption and decoding is generally carried out after the request is complete, so the decryption and decompression is more efficient than handling the decryption and decompression over several passes.

Figure 4:
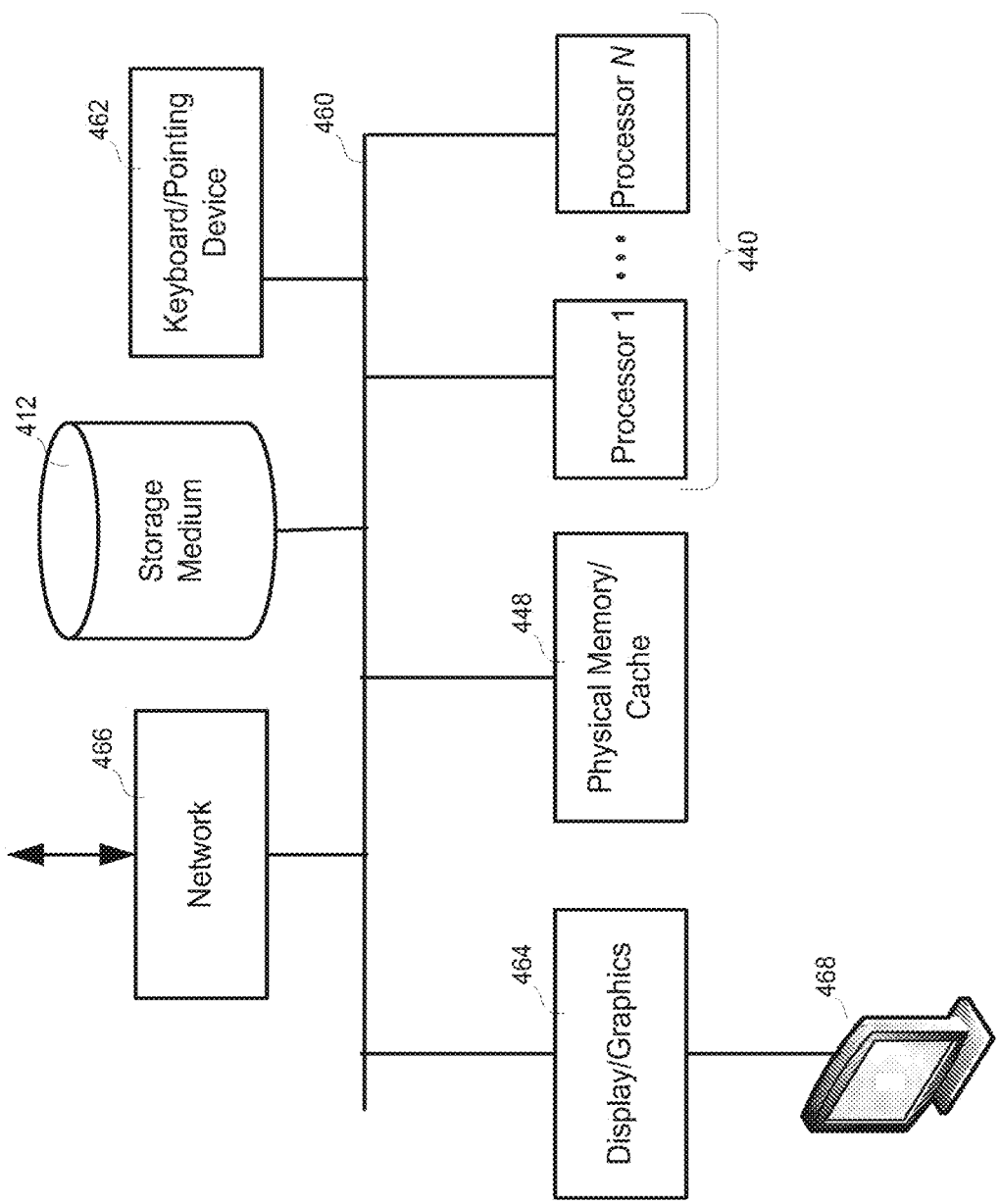
FIG. 4 illustrates an exemplary embodiment of one of the computers in FIG. 1.

Referring next to FIG. 4, shown is a block diagram depicting hardware components in an exemplary embodiment of the protected computer described with reference to FIG. 1. As shown, the N processing components 140 described with reference to FIG. 1 are depicted as N processors 440 that are coupled to a bus 460, and also coupled to the bus 460 are a memory 438 (corresponding to memory 138), storage medium 412 (corresponding to the storage medium 112), a keyboard/pointing device 462, a display/graphics adapter 464, and a network interface 466. In addition, a display 468 is coupled to the display/graphics adapter 464.

The storage medium 412 may be any device capable of holding substantial amounts of data, such as a hard drive, flash memory, or some other form of fixed or removable storage device. And the storage medium 412 in this embodiment stores processor-readable code with instructions to effectuate the functions described herein (e.g., the functions of the components in FIG. 1 depicted in the user 102 and kernel 104 environments). The processors 440 generally function to execute code and process other information that resides in memory and may be any specific or general-purpose processor such as an INTEL x86 or POWERPC-compatible central processing unit (CPU), and each may include one or multiple (e.g., four) cores. The memory 438 may include several gigabytes of random access memory, but this is merely exemplary and other memory types and sizes may be utilized. As one of ordinarily skill will appreciate, an operating system (e.g., LINUX® or WINDOWS®) may also reside in the storage medium 412 and memory 438 and function (e.g., when executed by one or more of the processors 440) to enable the components to operate as described with reference to FIG. 1.

As one of ordinary skill in the art in light of this disclosure will appreciate, FIG. 4 depicts only an exemplary embodiment, and the processes presented herein are not inherently related to any particular computing device or other apparatus. Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination embodied in firmware, software, application-specific integrated circuits (ASICs), and/or programmable logic devices.

It is to be appreciated that a lesser or more equipped computer system than the example described above may be desirable for certain implementations. Therefore, the configuration of the system illustrated in the figure can vary from implementation to implementation depending upon numerous factors, such as its intended use, price constraints, performance requirements, storage requirements, technological improvements, and/or other circumstances, or the like.

It should also be noted that while the embodiments and methods described herein may be performed and used with a computer similar to the one described herein, other embodiments and variations can be used with computer that vary from the described example. Therefore, nothing disclosed herein concerning the configuration of the illustrated computer should be construed as limiting the disclosure to a particular embodiment wherein the recited operations are performed by a specific combination of hardware components.

The various embodiments and variations thereof illustrated in the accompanying Figures and/or in the totality of this document are merely exemplary and are not meant to limit the scope of the invention. It is to be appreciated that numerous variations of the invention have been contemplated as would be obvious to one of ordinary skill in the art with the benefit of this disclosure. Additionally, while certain features may be categorized under one or more headings to assist with readability, it is to be appreciated that the feature(s) described under a particular heading may be used in associating with other portions of the specification and/or feature(s) described herein. Similarly, while certain embodiments are discussed in relation to specific languages, it is to be appreciated that the techniques disclosed herein can be used with any software language(s).

While the above described methodology has been discussed in relation to a particular sequence of events, it should be appreciated that minor changes to this sequence can occur without materially effecting the operation of the invention.

The above-described system and methodology, as has been indicated herein, can be implemented on a computing device, such as a personal computer, server, dedicated computing device, distributed processing system, in a cloud, or the like, or a separately programmed general purpose computer. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like, in fuzzy logic, artificial intelligence and/or neural networks. In general, any device(s) or module, which can be any combination of hardware and/or software, capable of implementing a state machine that is in turn capable of implementing the processes described herein can be used to implement this invention.

Furthermore, the disclosed methods may readily implemented in software using, for example, object or object-oriented software development environments that provide portable source code that can be used on a variety of computer or workstation and/or server platforms. The software can be stored on a non-transitory computer-readable medium, with the software including one or more processor executable instructions. The disclosed system and methodology may also be implemented partially or fully in hardware using standard logic circuits or, for example, a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein can be readily implemented in hardware and/or software using any suitable systems, means, structures, devices and/or the functionality stored on an appropriate information storage medium, by those of ordinary skill in the applicable art from the functional description provided herein and with a basic general knowledge of the computer and software arts.

While the embodiments illustrated herein may show some of the various components collocated, it is to be appreciated that the various components of the system can be located at distant portions of a distributed network, such as a communications network and/or the Internet and/or within a dedicated network. Thus, it should be appreciated that the various components can be combined into one or more devices or collocated on a particular node of a distributed network and/or in a cloud. As will be appreciated from the description, and for reasons of computational efficiency, the components can be arranged at any location within a distributed network without affecting the operation of the system.

Furthermore, it should be appreciated that various links connecting elements can be wired or wireless links, or a combination thereof, or any known or later developed element(s) that is capable of supplying and/or communicating data to and from the elements.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein.

In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate exemplary, and separately claimable, embodiment of the disclosure.

While exemplary aspects have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A malware protection agent method, comprising:
   at a protection agent executing on a client,
   receiving a request for content stored on a server device, the content comprising protocol level source code;
   forwarding, over a network, the request for content to the server device;
   requesting, over the network from a malware management agent, information regarding a plurality of malware threats including malware threats from a malware source;
   receiving the information from the malware management agent;
   receiving, over the network, the content from the server device, the content comprising at least one malware threat from the plurality of malware threats from the malware source;
   identifying the at least one malware threat in the content based on the received malware threat information; and
   regenerating the content according to the protocol level source code, comprising:
   modifying the content by removing or deactivating the at least one malware threat in the content; and
   forwarding the modified content for display.

2. The method of claim 1, wherein the request for content stored on the server device is received from a web browser, the server device comprises a web server, and the protection agent forwards the modified content to the web browser for display.

3. The method of claim 2, wherein the protocol level source code comprises at least one of: Hypertext Markup Language formatting information, JavaScript code, web server script code and Cascading Style Sheets formatting information.

4. The method of claim 2, further comprising, by the protection agent, annotating the modified content to denote whether a website reference is malicious.

5. The method of claim 1, wherein the identifying the at least one malware threat in the content based on the received malware threat information comprises:
   performing a Uniform Resource Locator analysis on the content to identify the at least one malware threat;
   performing an Internet Protocol analysis on the content to identify the at least one malware threat;
   performing an image analysis on the content to identify the at least one malware threat; and
   performing a JavaScript and Hypertext Markup Language analysis to identify the at least one malware threat.

6. The method of claim 5, wherein modifying the content by removing or deactivating the at least one malware threat in the content, comprises:
   aggregating the results of the Uniform Resource Locator analysis, the Internet Protocol analysis, the image analysis, and the JavaScript and Hypertext Markup Language analysis to remove the at least one malware threat in the aggregated result.

7. The method of claim 5, wherein the Uniform Resource Locator analysis, the Internet Protocol analysis, the image analysis, and the JavaScript and Hypertext Markup Language analysis are performed asynchronously.

8. The method of claim 1, wherein the identifying the at least one malware threat in the content based on the received malware threat information comprises:
   parsing the content into blocks;
   organizing the blocks into a hierarchy; and
   traversing the hierarchy to identify the at least one malware threat.

9. The method of claim 8, wherein the content comprises Hypertext Markup Language and parsing the content into blocks comprises: parsing the content into blocks based on distinct tagged portions in the Hypertext Markup Language content.

10. The method of claim 1, wherein the at least one malicious threat comprises: an illicit image, an illicit advertisement, a fake password request form, a cross-site scripting attack, spam content, or a phishing request.

11. A malware protection agent system comprising:
    at least one processor; and
    memory encoding computer executable instructions that, when executed by the at least one processor, perform a method comprising:
    at a protection agent executing on a client,
    receiving a request for content stored on a server device, the content comprising protocol level source code;
    forwarding, over a network, the request for content to the server device;
    requesting, over the network from a malware management agent, information regarding a plurality of malware threats including malware threats from a malware source;
    receiving the information from the malware management agent;
    receiving, over the network, the content from the server device, the content comprising at least one malware threat from the plurality of malware threats from the malware source;
    identifying the at least one malware threat in the content based on the received malware threat information; and
    regenerating the content according to the protocol level source code, comprising:
    modifying the content by removing or deactivating the at least one malware threat in the content; and
    forwarding the modified content for display.

12. The system of claim 11, wherein the request for content stored on the server device is received from a web browser, the server device comprises a web server, and the protection agent forwards the modified content to the web browser for display.

13. The system of claim 12, wherein the protocol level source code comprises at least one of: Hypertext Markup Language formatting information, JavaScript code, web server script code and Cascading Style Sheets formatting information.

14. The system of claim 12, further comprising, by the protection agent, annotating the modified content to denote whether a website reference is malicious.

15. The system of claim 11, wherein the identifying the at least one malware threat in the content based on the received malware threat information comprises:
  performing a Uniform Resource Locator analysis on the content to identify the at least one malware threat;
  performing an Internet Protocol analysis on the content to identify the at least one malware threat;
  performing an image analysis on the content to identify the at least one malware threat; and
  performing a JavaScript and Hypertext Markup Language analysis to identify the at least one malware threat.

16. The system of claim 15, wherein modifying the content by removing or deactivating the at least one malware threat in the content, comprises:
  aggregating the results of the Uniform Resource Locator analysis, the Internet Protocol analysis, the image analysis, and the JavaScript and Hypertext Markup Language analysis to remove the at least one malware threat in the aggregated result.

17. The system of claim 15, wherein the Uniform Resource Locator analysis, the Internet Protocol analysis, the image analysis, and the JavaScript and Hypertext Markup Language analysis are performed asynchronously.

18. The system of claim 11, wherein the identifying the at least one malware threat in the content based on the received malware threat information comprises:
  parsing the content into blocks;
  organizing the blocks into a hierarchy; and
  traversing the hierarchy to identify the at least one malware threat.

19. The system of claim 18, wherein the content comprises Hypertext Markup Language and parsing the content into blocks comprises: parsing the content into blocks based on distinct tagged portions in the Hypertext Markup Language content.

20. The system of claim 11, wherein the at least one malicious threat comprises: an illicit image, an illicit advertisement, a fake password request form, a cross-site scripting attack, spam content, or a phishing request.

* * * * *